United States Patent [19]
Nehr

[11] 3,797,613
[45] Mar. 19, 1974

[54] AUTOMATIC ADJUSTER WITH LIMITING DEVICE

[75] Inventor: Charles W. Nehr, Bloomfield, Mich.

[73] Assignee: Rockwell International Corporation, Pittsburgh, Pa.

[22] Filed: Oct. 19, 1972

[21] Appl. No.: 299,072

[52] U.S. Cl. ........................................ 188/79.5 GE
[51] Int. Cl. ............................................. F16d 65/56
[58] Field of Search 188/79.5 S, 69.5 GE, 69.5 GC, 188/196 B

[56] References Cited
UNITED STATES PATENTS

| | | | |
|---|---|---|---|
| 3,227,247 | 1/1966 | Sherretts et al. | 188/79.5 GE |
| 3,017,962 | 1/1962 | Ingres | 188/79.5 GC |
| 2,167,706 | 8/1939 | Berno | 188/79.5 GC X |
| 2,340,464 | 2/1944 | Gates | 188/79.5 S |
| 3,068,964 | 12/1962 | Williams et al. | 188/79.5 GE |

Primary Examiner—Duane A. Reger

[57] ABSTRACT

An adjusting wedge type brake actuator in which the degree of self-adjustment is so limited that an axially expansible plunger cannot be expanded to the point at which the connection between its parts becomes so weak that it is subject to sudden failure under load. An outwardly projecting snap ring located in a groove at the end of the adjusting stud engages the adjusting screw to limit the adjustment. This self-limited automatically adjusted brake actuator gradually becomes ineffective during lining wear after the adjustable plunger has reached its limit of adjustability rather than suddenly when the actuator no longer can withstand the loads applied thereto.

1 Claim, 4 Drawing Figures 3,797,613

AUTOMATIC ADJUSTER WITH LIMITING DEVICE

BACKGROUND OF THE INVENTION

In recent years wedge actuated brake mechanisms have been widely adopted for heavy duty vehicles such as highway and off highway heavy duty trucks and other vehicles. Examples of such brake mechanisms are illustrated in U.S. Pat. No. 3,037,584 issued June 5, 1962 to F. T. Cox et al., for "Wedge Actuated Brake Assembly" and U.S. Pat. No. 3,599,762 issued Aug. 17, 1971 to Frank T. Cox et al., for "Wedge Actuated Three-Shoe Brake". Commercial versions of brakes such as these range in size from 15 to 42 in. in diameter.

In wedge actuated brakes such as these the brake shoes are forced outwardly into engagement with the associated brake drum by forcing a wedge between the adjacent ends of a pair of aligned plungers which are disposed between opposed ends of adjacent brake shoes. The wedge is free on its support to float slightly, the actuated lateral position of the wedge being determined by the resultant of the reaction forces exerted upon it by the opposed plungers.

These brakes are subjected to tremendous loads in operation due to the size of the vehicles and of the loads carried by them. This results in relatively rapid wear of the lining of the brake shoes of such brakes. As a result it is customary to equip such brakes with a mechanism which will automatically adjust the brake actuator to accommodate for wear of the brake linings and to maintain the travel of the brake shoes and of the associated plungers between their disengaged and engaged positions substantially constant throughout the normal life of the linings. An example of such an adjustment mechanism is illustrated in U.S. Pat. No. 3,068,964 issued Dec. 18, 1962 to W. J. Williams et al. for "Automatic Brake Adjustment".

In such adjusting mechanisms one of the wedge actuated plungers for each brake shoe is of adjustable axial length. Its length is increased automatically to accommodate for decrease in shoe lining thickness as the lining wears.

While adjusting mechanisms of this type work effectively so long as the brake shoe linings are replaced after the normally intended amount of wear, if the shoe linings are not replaced when replacement is necessary, the adjusting mechanism will continue to increase the length of the adjustable length plunger to the point at which the connection between the relatively new parts of the plunger is not sufficiently strong to withstand the loads to which it is subjected. The connection then becomes loose and the parts distorted. Ultimately the connection may fail completely. The would render the entire brake inoperative since the actuating force of the wedge against each shoe is dependent upon the reaction force against the adjacent shoe in a brake of this type.

While this condition only arises from improper maintenance of the brake assembly, when this extreme degree of neglect occurs, the entire brake can fail suddenly under load when the brake is actuated.

SUMMARY OF THE INVENTION

The essential purpose of the present invention is to provide an improved self-adjusting wedge type brake actuator in which the degree of self-adjustment is so limited that the axially expansible plunger cannot be expanded to the point at which the connection between its parts becomes so weak that it is subject to sudden failure under load. While with such a self-limited automatically adjusted brake actuator the brake assembly will gradually become ineffective as the lining continues to wear after the adjustable plunger has reached the limit of its adjustability, this will occur gradually rather than suddenly when the actuator can no longer withstand the load as in the prior designs. The neglectful vehicle operator will thus have warning due to the gradual reduction in effectiveness of his brakes and an opportunity to have the brake shoes relined rather than being faced with a sudden brake failure producing a potentially dangerous emergency.

The foregoing and other objects of the present invention will become more fully apparent by reference to the appended claims and as the following detailed description proceeds in reference to the accompanying drawings.

DESCRIPTION OF THE INVENTION

Figure 1:
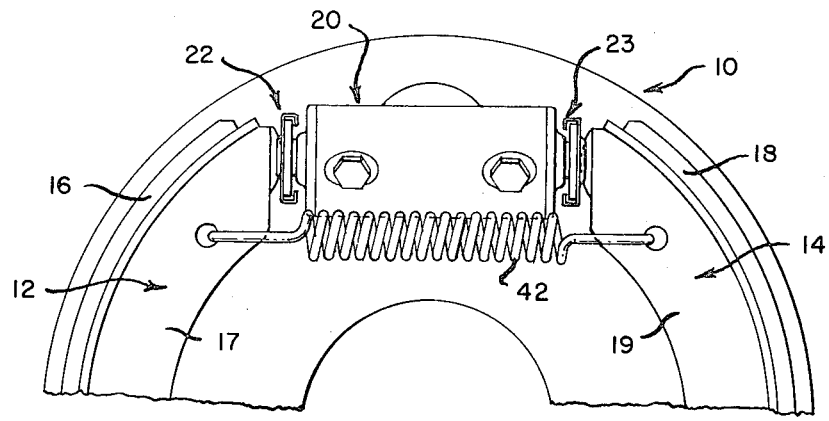
FIG. 1 is a fragmentary view of a brake assembly embodying the present invention.

With reference to FIG. 1 there is shown a brake shoe and actuator assembly 10 such as may be normally employed in automotive drum type brakes. In this instance the assembly consists of opposite brake shoes 12 and 14 having brake linings 16 and 18 respectively. The webs 17 and 19 of the brake shoes may be connected at one or both ends by an actuator 20, or the other ends of the brake shoes (not shown) may be pivotally anchored as is common practice.

The actuator 20 is provided with an adjusting mechanisms 22 and 23 to compensate for brake lining wear. When only one actuator is provided and the brake shoes are anchored at the other end, (as in FIG. 15 of said U.S. Pat. No. 3,037,584), the actuator is provided with two adjusting mechanisms 22 and 23, one each between actuator 20 and brake shoe 12 and between actuator 20 and brake shoe 14, as illustrated. However, when the brake mechanism 10 is equipped with actuators at both ends of the brake shoes (as in FIG. 1 of U.S. Pat. No. 3,037,584) only one adjusting mechanism will be provided at each actuator in diagonal opposite position to adjust both brake shoes 12 and 14 and independently of each other. In any case, the actuators 20 and adjusting mechanisms 22 and 23 will be identical and it will therefore suffice to describe only one of them in detail.

Figure 2:
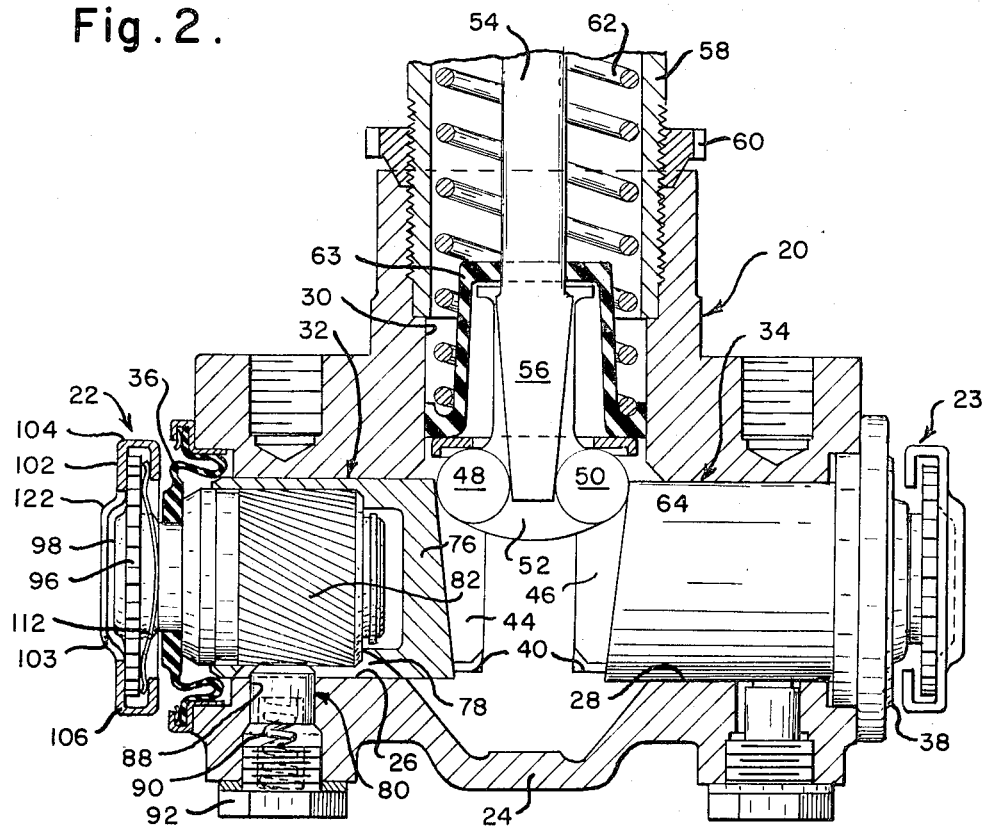
FIG. 2 is a sectional view through the brake actuator of the assembly of FIG. 1.

With reference to FIG. 2 the actuator 20 comprises a housing 24 which may be integral with or attached to a brake spider or support (not shown) as disclosed in U.S. Pat. No. 3,037,584. Housing 24 is provided with aligned bores 26 and 28 which are intersected at the center of the housing by a stepped bore 30 the axis of which is normal to the common axis of bores 26 and 28.

Bores 26 and 28 receive reciprocating plunger assemblies 32 and 34, respectively, extending outwardly thereof in abutting engagement with the brake shoes 12 and 14 respectively as is illustrated in FIG. 1. The outer end of the bores 26, 28 are sealed by diaphragm type seals 36 and 38 securely attached to the housing 24 and connected in sealing relation to the shank of the studs of the plunger assemblies 32, 34 respectively to prevent the entrance of foreign matter into the housing 24 and the plunger assemblies 32 and 34 while retaining lubricant therein.

When the plunger assemblies 32, 34 are retracted, their inner ends abut against a central raised boss portion 40 within the housing 24. The brake shoes 12 and 14 are normally retracted by the return spring 42 to press the plunger assemblies 32 and 34 inwardly against the boss 40.

The inner ends of adjusting nuts of the plunger assemblies 32, 34 are slotted transversely as at 44 and 46 respectively, the slots being inclined inwardly in a converging direction towards each other. The plunger slots 44, 46 are adapted to receive rollers 48 and 50 respectively which are rotatably secured within a bifurcated cage 52 attached to a pushrod 54. The lower end of the pushrod 54 is provided with a wedge extension 56 which extends into the roller cage 52 and between the rollers 48 and 50. The opposite faces of the wedge 56 are inclined at an angle corresponding to the angle of inclination of the plunger slots 44 and 46. This wedge and roller actuating mechanism is disclosed in detail in the aformentioned U.S. Pat. No. 3,037,584.

The pushrod 54 and part of the wedge 56 and roller cage 52 extend outwardly through bore 30 and into a tubular adapter housing 58 threaded into the actuator housing 24 and secured thereto by a large locknut 60'. The adapter housing 58 may be attached to a hydraulic or air pressure motor or mechanical lever linkage (not shown) as disclosed in U.S. Pat. No. 3,037,584 to reciprocate pushrod 54 when actuated. A coil spring 62 retained at one end in fixed position relative to the outer end of the pushrod 54 by a retainer disc (not shown) and seating at its other end against the radial flange of a rubber boot 63 which rests upon a retainer disc 64 seated upon shoulders (not shown) in the cage 52. Spring 62 normally tends to urge the pushrod 54 outwardly retracting the wedge and roller assembly sufficiently to allow the plungers 32 and 34 to abut against the anchor boss 40. Boot 63 provides a seal between the pushrod 54 and the bore 30 to prevent egress of lubricant and ingress of contaminants.

When the pushrod 54 is forcibly displaced inwardly of housing 24 by either of the aforementioned operator means (not shown), the wedge and roller assembly 48, 50, 56 is displaced inwardly causing the rollers 48, 50 to roll along the inclined surfaces of the slots 44 and 46 thereby forcing plunger assemblies 32 and 34 oppositely outwardly of housing 24 to move the associated brake shoes 12 and 14 apart against the force of the return spring 42 to contact an associated brake drum (not shown).

The plunger assemblies 32 and 34 are each adjustable to vary their effective lengths and are of identical construction.

By way of illustration, the adjustable plunger 32 embodies an adjusting mechanism 22 of a type similar to that disclosed in detail in U.S. Pat. No. 3,068,964 and it includes an axially slidable adjusting plunger member 76 held aginst rotation by a pawl and guide 80 which extends into an axially elongated radial slot 78 in member 76. Member 76 receives an inner adjusting nut 82 which is rotatable relative to member 76 under certain conditions as will be explained. Adjusting nut 82 is provided with spiral teeth 84 (best shown in FIGS. 3 and 4) on its outer surface which are engaged by complementary spiral teeth on the end of pawl and guide 80. Pawl and guide 80 is resiliently supported within an aperture 88 in housing 24 and biased into engagement with teeth 84 by a spring 90 held in place by a cap screw 92.

Figure 3:
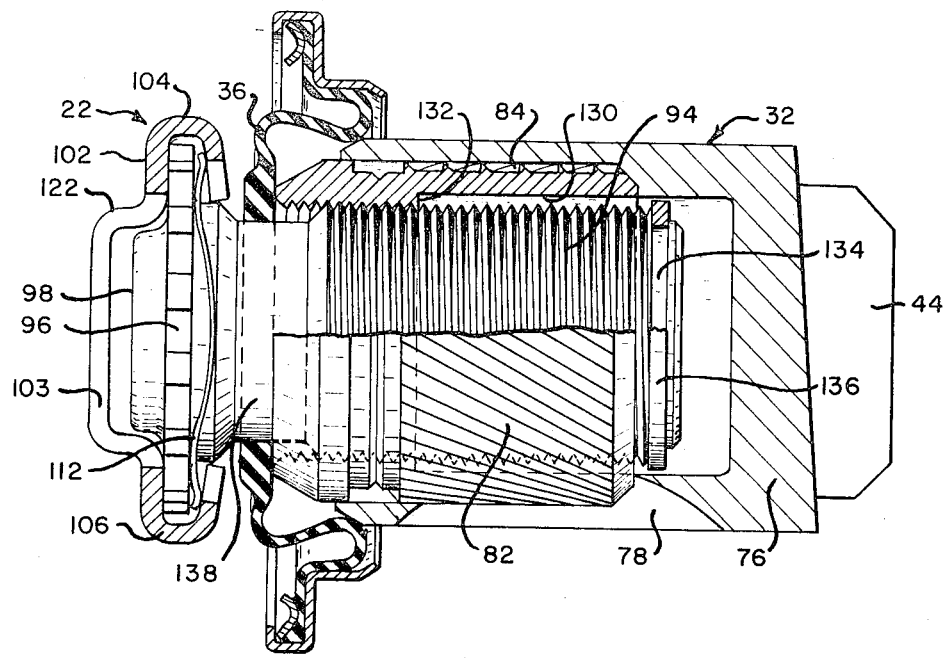
FIG. 3 is a sectional view through one of the automatically adjusted axially expansible plunger assemblies of the actuator of FIG. 2 showing the plunger assembly in its fully contracted condition.
Figure 4:
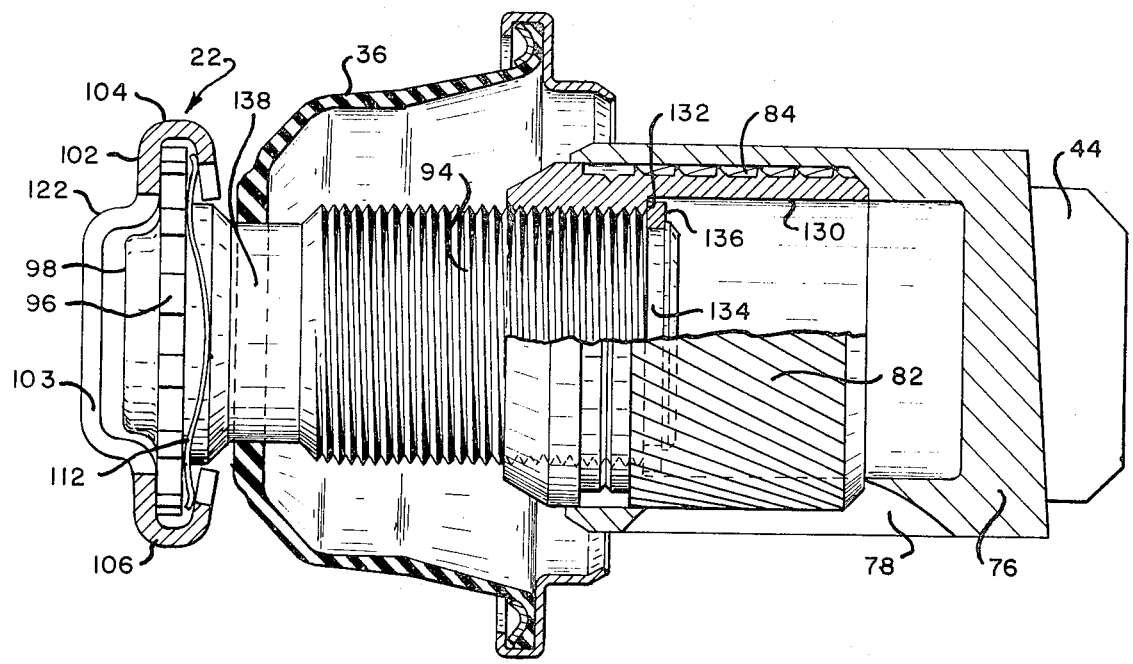
FIG. 4 is a view similar to FIG. 3 but showing the plunger assembly in its fully expanded condition.

Threaded into the adjusting nut 82 is an adjusting stud 94 provided with a star wheel 96 by which the stud 94 may be manually rotated in or out of nut 82. With further reference to FIGS. 3 and 4 the outer end of stud 94 has a central boss portion 98 having a bearing surface against which the end of web 17 of the brake shoe 12 abuts.

Surrounding the star wheel 96 is a generally rectangular clip 102 formed of sheet metal. The web 17 extends through the complementarily shaped aperture 103 of clip 102 into abutment with boss 98 and prevents rotation of clip 102. The ends 104 and 106 of the longer side of the clip 102 are bent into substantially U-shaped forms to extend over and behind the star wheel 96 as shown in FIGS. 3 and 4. The spaces between the U-bends and the edge of the star wheel 96 is occupied by a leaf spring 112 extending transversely across the smaller side of the clip 102. The spring is prestressed and bent as shown towards the star wheel 96 against which it resiliently abuts. Thus, the clip 102 and spring 112 normally frictionally retain the star wheel 96 from turning.

The center of the clip 102 is pressed outwardly from its generally flat base portion to provide a circular boss 122 which is slotted at 103 longitudinally of the clip. The slot 103 extends into the flat base portion of the clip on both sides of the boss 122 and is adapted to receive the end of the web 17 of brake shoe 12 which extends into the slot and abuts against the bearing surface of the boss 98 on the stud 94. Thus, the brake shoe 12 is held against lateral shifting movement in the slot 103 allowing, however, rotational movement of the star wheel 96 upon manual adjustment which can be accomplished by turning the star wheel with a tool inserted between the teeth of the star wheel. The resisting force of the spring 112 is overcome so that the star wheel can be turned. The brake shoe 12 is then moved the same distance as the stud 94 advances.

As shown in FIGS. 2 and 4 the round boss 122 on clip 102 fits closely around the boss 98 on stud 94. The brake shoe web is thus accurately positioned and centered in coaxial relation with the stud 94. to assure proper operation of the brake.

The operation of the automatic adjustment will now be described. When the plungers 32, 34 are displaced outwardly upon actuation of the roller and wedge mechanism as described earlier, the teeth of the pawl 80 ride up on the spiral external teeth 84 of the adjusting nut 82. The size and the spiral angle of the teeth 84 are selected so that the pawl 80 will only ride up on the teeth but will not disengage from the teeth under normal braking operation, that is, these values are proportional to the predetermined clearance between the brake shoe lining and the brake drum. However, when the lining is worn the plunger assembly 32 must travel a greater distance outwardly causing the teeth of the pawl 80 to ride over the top of the teeth in which they have been engaged and fall into the next group of teeth. Upon return movement of the plunger 32 inwardly, the pawl 80 which now is fully engaged with the spiral teeth causes the adjusting nut 82 to turn, thereby advancing the stud 94 outwardly due to its threaded connection therewith.

As indicated at the outset, in prior automatically actuated adjustment mechanisms, as the shoe lining continues to wear the strength of the screw connection between the stud and the adjusting nut becomes progressively weaker and can result in complete failure of the mechanism.

As is most clearly apparent from FIGS. 3 and 4, the nut 82 is internally threaded at its end adjacent star wheel 96 and is formed with a coaxial smooth counterbore 130 throughout the reaminder of its length. The end of counterbore 130 provides a flat radial shoulder 132 forming a stop.

Stud 94 is externally threaded over a major portion of its overall length, terminating at an end on an annular groove 134 in which is mounted a snap ring 136, the external diameter of snap ring 136 is less than the internal diameter of bore 130 so that as nut 82 rotates to advance stud 94 to the left as viewed in FIGS. 3 and 4, ring 136 will gradually move into bore 130 until it finally abuts stop 132. Once ring 136 abuts stop 132 further axial expansion of the plunger assembly 32 by relative rotation between nut 82 and stud 94 is precluded. This fully expanded position is illustrated in FIG. 4. As will be noted the entire length of the threaded portion of nut 82 is still engaged with the threaded portion of stud 94 thus maintaining this connection of maximum strength to resist loading thereof during brake application.

It will be further noted that the seal 36 engages stud 94 at a reduced diameter section 138 outboard of the threaded portion thereof to protect the stud threaded portion and its connection to the nut 82 from dirt and corrosion and to maintain lubrication thereof.

What is claimed is:

1. In a wedge actuated brake assembly having at least a pair of movable brake shoes adapted to engage a surrounding brake drum, a self-limiting self-adjusting brake actuating mechanism comprising a housing having aligned openings, plunger assemblies guided for rectilinear movement in said openings and adapted when urged apart to urge said shoes toward said drum, at least one of said plunger assemblies being automatically axially expansible to accommodate wear of the lining of the associated brake shoe, said one of said plunger assemblies having an axially elongated adjusting nut received therein and having a partially threaded bore, a stud operatively connected in thrust transmitting relation to the associated brake shoe at one end and threadedly received in said adjusting nut from the other end thereof, means for automatically imparting limited rotation to said adjusting nut whenever the travel of said one plunger assembly between its brake disengaging and brake engaging positions exceeds a predetermined amount as a result of brake shoe lining wear to thereby advance said stud relative to said nut to increase the overall axial length of said plunger assembly, the partially threaded bore of said adjusting nut having a first portion having a first diameter, internal threads being formed on said first portion, said partially threaded bore having a second portion having a second diameter that is larger than said first diameter, and means for limiting the travel of said stud relative to said nut thereby to prevent disengagement thereof in response to rotation of said adjusting nut, said means comprising a groove formed in said stud and extending about the circumference thereof, a snap ring received in said groove and projecting outwardly from said stud, the outer diameter of said snap ring being greater than said first diameter and less than said second diameter whereby said snap ring can advance through said second portion of said threaded bore but cannot enter said first portion of said bore.

* * * * *